April 1, 1969   R. W. GUERTLER   3,435,811

MULTIPLE INJECTION FUEL PUMP

Filed June 14, 1967

INVENTOR
RUDOLF W. GUERTLER
ATTY

April 1, 1969 R. W. GUERTLER 3,435,811
MULTIPLE INJECTION FUEL PUMP
Filed June 14, 1967 Sheet 2 of 2
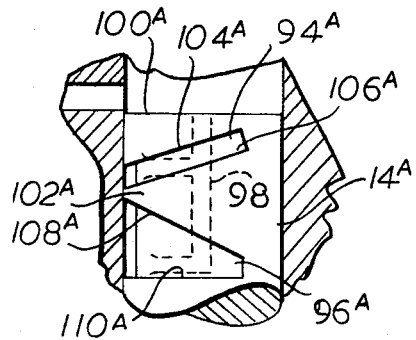
FIG. 3.
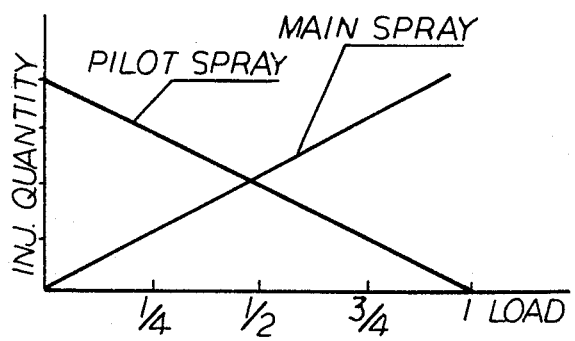
FIG. 4.
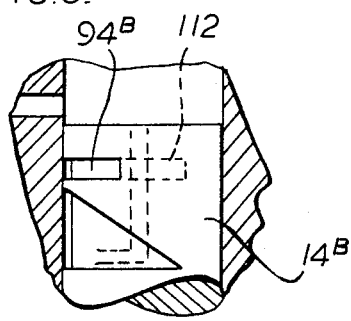
FIG. 5.
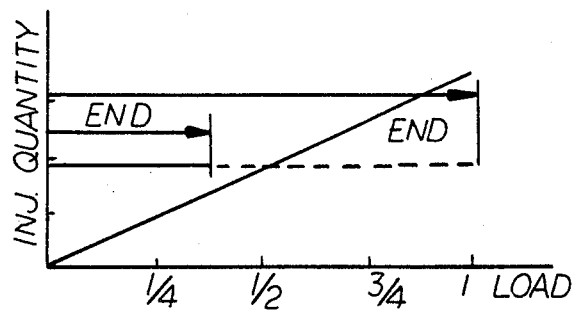
FIG. 6.
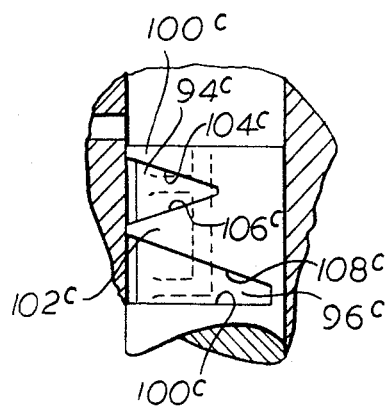
FIG. 7
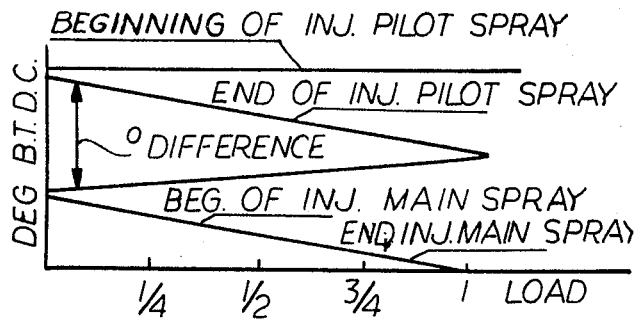
FIG. 8.
INVENTOR
RUDOLF W. GUERTLER
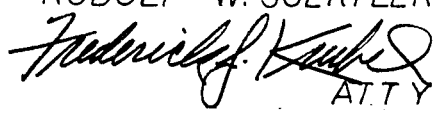
ATTY United States Patent Office 3,435,811
Patented Apr. 1, 1969

3,435,811
MULTIPLE INJECTION FUEL PUMP
Rudolf W. Guertler, Fort Wayne, Ind., assignor to International Harvester Company, Chicago, Ill., a corporation of Delaware
Filed June 14, 1967, Ser. No. 646,033
Int. Cl. F02m 39/00; F04b 13/02, 19/22
U.S. Cl. 123—139                                        8 Claims

ABSTRACT OF THE DISCLOSURE

A fuel injection pump adapted to be used with a multiple injection fuel injection nozzle. The pump is designed to control the timing and duration of the pilot and main spray of the injection nozzle in response to the relieving of fuel pressure built up in the pumping chamber of the pump.

---

This invention relates to fuel injection pumps and particularly to a fuel injection pump of the type which can be used with an injector device which provides a dual injection.

A principal object is to provide in a fuel injection pump means for controlling the timing of a pilot injection and a main injection in response to varying load conditions on the engine.

Another object of the invention is to provide in a fuel injection pump means for controlling the quantities of fuel to be injected during a pilot injection and a main injection in response to varying load conditions on the engine.

A further object of this invention is to provide a fuel injection pump for use with an associated dual injector device wherein the pump construction is such that the pressure build-up in the pumping chamber is interrupted to allow a pilot injection and a main injection by the injector device.

Another object is to provide in a fuel injection pump a pumping plunger provided with pressure relieving means which is effective to control the timing of the pilot injection and main injection of an associated injection device.

The above and other objects and advantages of the invention will be more readily apparent when considered in connection with the accompanying drawings in which:

FIGURE 1 is an elevation view partially in section of a fuel injector device;

FIGURE 2 an elevation view of a portion of a fuel injection pump embodying the principles of the invention;

FIGURE 3 shows the upper portion of a pumping plunger having pressure relieving grooves used in connection with the control of pilot and main injections;

FIGURE 4 is a diagram relating to the injection characteristics when a pumping plunger of the type illustrated in FIGURE 3 is used.

FIGURE 5 shows another modification of a pumping plunger used in connection with the control of pilot and main injections;

FIGURE 6 is a diagram relating to the injection characteristics when a pumping plunger of the type illustrated in FIGURE 5 is used;

FIGURE 7 shows another modification of a pumping plunger;

FIGURE 8 is a diagram relating to the injection characteristics when a pumping plunger of the type illustrated in FIGURE 7 is used.

Figure 2:
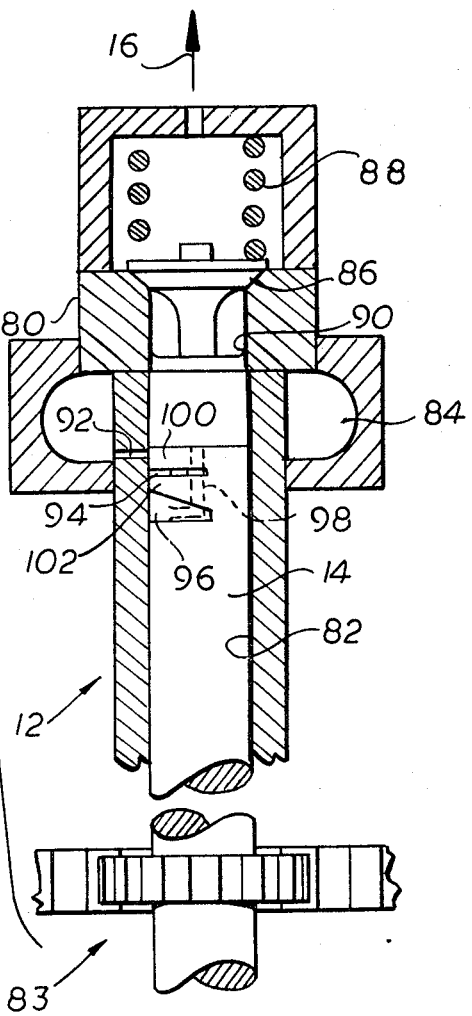

Referring now to the drawings wherein like reference characters in the several views designate the same parts 10 designates a fuel injector device and 12 a portion of a fuel injection pump which supplies pressurized fuel to the injector device 10. The injection pump 12 has a pumping plunger 14 actuated at its lower end by a cam (not shown) for reciprocating up and down movement. The plunger 14 moves up and down and builds up enough pressure during its upward stroke as viewed in FIGURE 2 to open a fuel delivery valve and force pressurized fuel through conduit 16 to the injector device 10 into an inlet passage, through a pair of valves and through spray orifices to the cylinder of an internal combustion engine with which the injector device is associated.

The injector device 10 is described in detail in copending application for U.S. patent Ser. No. 646,032, filed on June 14, 1967. The injector device 10 comprises a nozzle body 18 having an inlet fuel passage 20 formed therein, a fuel chamber 22, a second fuel passage 24 and a third fuel passage 26. The device 10 also includes first and second orifice means 28 and 30, through which fuel is injected into the cylinder of an engine. The device 10 further includes a first valve means in the form of a cylindrical sleeve valve member 32, for controlling the flow of fuel to orifice means 28 and a second valve means in the form of a needle valve 34 for controlling the flow of fuel to orifice means 30 and first and second compression spring means 36 and 38.

The injector device 10 may be secured in the engine block by suitable means such as the threads 40 formed on a portion of the nozzle body. The nozzle body may have formed therein a bore 42, somewhat larger in diameter than the needle valve 34 disposed therein to form the circumferential passage 26 which communicates with the fuel chamber 22 at its upper end and orifice means 30 at its lower end. A bore 44 is formed above the fuel chamber 22 to slidingly receive the sleeve valve member 32. Pressurized fuel in the fuel chamber 22 exerts an upward force on the sleeve valve 32.

The sleeve valve 32 is formed with a bore 46 to slidingly receive the needle valve 34 therethrough. The sleeve valve 32 is also formed with an enlarged head 48 at the upper end thereof to define a shoulder 50 which seats in a counterbore 52 formed in the upper end of bore 44. A fuel duct 54 extends through the wall of the sleeve valve 32 at its lower end. Liquid fuel reaches this duct 54 through counterbore 56 formed on the lower end of the sleeve valve 32. When fuel pressure acting on the lower end of sleeve valve 32 moves the latter upwardly, the duct 54 is brought into registry with fuel passage 58 which is in communication with fuel passage 24.

The needle valve 34 has an enlarged portion 60 formed at its upper end which defines a shoulder 62 against which the upper end of sleeve valve 32 is adapted to seat during its upward movement. This shoulder 62 acts as a stop for the sleeve member 32 to restrain its upward movement so long as the fuel pressure on the lower end of the sleeve valve is below a predetermined amount. When the fuel pressure rises above such predetermined amount, the upward movement of the sleeve valve is transmitted to the needle valve 34 to raise the latter from its seat. The upper portion of the needle valve and the compression spring members 36 and 38 are disposed in a bore 63 in upper part of the nozzle body A radially extending flange 64 is formed on the upper portion 60 of the needle valve 34 and spring means 36 and 38 act against opposite sides of this flange. The compression spring means 36 surrounds upper portion 60 and seats on the flange 64 and upper surface of sleeve valve 32. It urges sleeve valve 32 to a closed position, i.e., seated on the shoulder 50 to hold the fuel duct 54 out of registry with fuel passage 58 and positioned below passage 58 as viewed in FIGURE 1. Compression spring 36 is a weaker spring than compression spring 38 thus allowing the sleeve valve 32 to be raised by a relatively small fuel pressure without disturbing the needle valve from its seated position. The compression spring 38 is a relatively strong spring member and is disposed between the upper side of flange 64 and a reaction member 66 seated in a nozzle body cap member 68. The latter may be threaded onto the upper part of the nozzle body. A leak-off channel 69 may be provided in the nozzle body to carry leakage fuel back to the fuel supply reservoir (not shown). The lower end of the needle valve may have a valve face 70 formed thereon to seat on a complementary valve seat 72 formed in the nozzle to control the opening to main injection orifice means 30.

Orifice means 28 may comprise a single orifice or a plurality of orifices in communication with fuel passage 24, and orifice means 30 may comprise a single orifice or a plurality of orifices adapted to be controlled by needle valve 34. The orifice means 28 is positioned to direct a certain amount of fuel into or close to a high temperature source. Its purpose is to provide a pilot injection to help ignite the main spray. The main injection is provided by orifice means 30, and this orifice means 30 is directed into or close to the flame created by the combustion of the pilot injection. The two valves, sleeve valve 32 and needle valve 34, open in succession in response to the different pressures built up in injection pump 12.

The fuel injection pump 12 comprises in part a housing 80, defining a bore 82 in which pumping plunger 14 is disposed for reciprocating movement in response to the action of a conventional cam (not shown), at its lower end. Appropriate means is also provided to rotate the plunger 14 on its axis. Such means may be connected at the lower end of the plunger and may comprise, for example, a conventional rack and pinion arrangement 83. The pinion is connected to the plunger, and the to and fro movement of a gear rack meshing therewith would rotate the plunger in response to changing engine load conditions. The pump 12 also comprises a fuel reservoir or receiving chamber 84 adapted to be connected to and receive fuel from a fuel supply source (not shown). A delivery valve 86 normally closed by the action of compression spring 88 is adapted to be opened by an increase of fuel pressure in a pumping chamber 90 wherein pressure is built up as the plunger 14 moves upwardly. With increase in pressure to a predetermined amount, the delivery valve 86 is opened and fuel under pressure is sent to the fuel injector device 10 through conduit 16 connected to the injection pump. Fluid passage means or spillport means 92 is provided to establish fluid communication between the receiving chamber 84 and pumping chamber 90. The pumping chamber 90 takes its fill from the receiving chamber 84 through this fluid passage when the plunger 14 is in a position below the spillport as shown, for example, in FIGURE 3.

The upper portion of pumping plunger 14 has a narrow transversely extending pressure relief groove or passage 94 and a substantially triangular shaped pressure relief groove or passage 96 formed on its periphery, the two passages 94 and 96 being axially spaced from each other for reasons hereinafter more fully described. The two passages 94 and 96 communicate with the pumping chamber 90 by internal passage means 98 formed in the plunger 14. When the plunger 14 moves upwardly a shoulder 100 on the upper end thereof blocks the flow of fuel from the fuel chamber 84 through the spillport 92. During the continuing upward travel of plunger 14, pressure builds up in pumping chamber 90 and fuel is forced past the delivery valve 86 against the force of spring 88 through conduit 16 to the fuel injector device 10. The notch or pressure relief groove 94 is provided to relieve the pressure in the pumping chamber as it moves into registry with the spillport 92. As the plunger 14 continues to move upwardly, a land 102 between the notches 94 and 96 again seals off the spillport 92 and pressure in the pumping chamber 90 continues to build up as long as the spillport 92 remains blocked. Continuing upward movement of the plunger 14 eventually brings the pressure relief passage 96 into registry with spillport 92 once again causing the pressure in the pumping chamber to be relieved.

Figure 1:
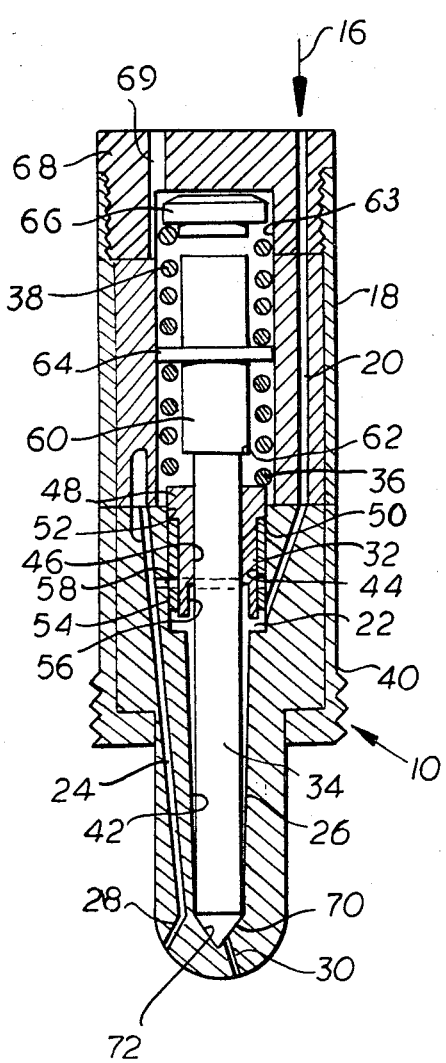

The purpose of relieving pressure in the pumping chamber is to effect a control of the pilot injection and main injection of a fuel injection device such as the device shown in FIGURE 1. This can best be understood by describing the operation of the fuel injector device 10 and the fuel injection 12 in relation to each other. When the plunger 14 of the injection pump moves upwardly to the point where the shoulder 100 cuts off the spillport means 92, pressure is built up in the pumping chamber 90, opening delivery valve 86 and sending pressurized fuel through conduit 16 to the injector device 10. The pressurized fuel moves through inlet fuel passage 20 to the fuel chamber 22 and acts on the sleeve valve 32 to move it upwardly against the shoulder 62 on the needle valve. In doing so, the fuel duct 54 of the sleeve valve is brought into registry with fuel passage 58 and fuel is sent to orifice means 28 via passage 24. This occurs at a predetermined relatively low fuel pressure such, for example, as about 1500 p.s.i., because the spring 36 is made relatively weak. This provides a pilot spray to give a high energy source for the main injection. As the plunger 14 continues to move upwardly, the pressure relief passage 94 in the plunger registers with spillport means 92 and fuel flows from the pumping chamber 90 back to the fuel chamber 84, relieving the pressure in the pumping chamber 90 and in the system. This allows spring 36 to reseat the sleeve valve 32 on shoulder 50, closing off fluid communication with the fuel duct 58. As the plunger 14 continues to move upwardly, land 102 again blocks spillport 92 and pressure in the pumping chamber continues to build up. The construction of the plunger is such that fuel pressure can now build up to a considerably higher amount such, for example, as 3000 p.s.i. This fuel pressure moves the sleeve valve 32 up against the shoulder 62 with sufficient force to overcome the relatively stronger spring 38 and lift the needle valve 34 from its seat 72 thus permitting fuel to pass through orifice means 30. This is the main injection. As the sleeve valve 32 moves up with the needle valve 34, the lower edge of the sleeve valve closes off duct 58 feeding orifice 28. As the plunger 14 moves downwardly at the end of the pumping stroke, the pressure is decreased, of course, and the valves 32 and 34 are reseated, and the cycle is then repeated.

It may be desirable under varying load conditions to adjust the duration of either or both the pilot injection and main injection of the injector device 10. In FIGURE 3 the pumping plunger 14a as shown has means thereon for decreasing the amount of fuel injected during the pilot injection with an increase in load on the engine. The pressure relief passage or groove 94a defined by lands 100a and 102a has inner and outer extremities 104a and 106a and is formed at an angle with the axis of the plunger 14. Thus when the plunger 14a is rotated in the direction of the arrow with an increase in load, the passage 94a will come into registry with spillport 92 sooner as the plunger 14a moves upwardly thus reducing the pressure in the pumping chamber sooner and thereby cutting off the pilot injection sooner. This is shown diagrammatically in FIGURE 4, the pilot spray being progressively decreased with an increase in load.

It will be observed from FIGURE 3 that the pressure relief groove 96a is of substantially right triangular shape being defined in part by land 102a and having inner and outer extremities 108a and 110a. Since the inner extremity 108a is slanted as shown, the main injection of the associated injector device is of longer duration and is cut off later with an increase in engine load. This is also illustrated diagrammatically in FIGURE 4.

Referring now to FIGURES 5 and 6, it will be observed that this modification shows a plunger having a pressure relief groove 94b which extends substantially normal to the plunger axis but does not extend as far circumferentially as the pressure relief passages 94 and 94a of FIGURES 1 and 3 respectively. The dotted lines indicate a full length pressure relief groove for comparison. The shortened pressure relief groove 94b cuts off the pilot injection at the lower end of the load range as indicated on FIGURE 6. It is apparent that if plunger 14b is rotated in the direction of the arrow to accommodate the higher end of the load range, there will be no pilot injection, as such, that is, there will be no interruption in fuel being injected into the engine cylinder by the injector device 10.

In FIGURE 7 another modified plunger 14c is illustrated. The pressure relief passage 94c is defined by lands 100c and 102c and has inner and outer extremities 104c and 106c which form a substantially isosceles triangular shaped groove on the periphery of the plunger. The pressure relief groove 96c is of a right triangular shape like the corresponding relief grooves in FIGURES 2, 3 and 5 and has inner and outer extremities 108c and 110c. It will be apparent that with this plunger design, the pilot injection lasts longer with an increase in engine load, and the main injection begins sooner with an increase in load. With the configurations of the pressure relief grooves 94c and 96c both quantity of the pilot injection and the time interval between the pilot and main injection are varied with the change in engine load as is more clearly illustrated in FIGURE 8.

Thus it will be apparent that I have advantageously provided a fuel injection pump particularly adaptable for use in a dual injection fuel injection system. The control of the pilot and main injections are effected in part by a novel construction of this fuel injection pump wherein the pumping plunger is constructed to effect a relieving of pressure in the pumping chamber at predetermined times. The plunger may be provided with pressure relief passages of different constructions to vary the quantity and timing of the pilot and main injection.

While certain preferred embodiments of the invention have been specifically disclosed, it is to be understood that the invention is not limited thereto as other variations will be apparent to those skilled in the art and the invention is to be given its fullest possible interpretation within the terms of the following claims. It is further to be understood that while the invention is shown and described in conjunction with a novel injector device or nozzle capable of emitting two distinct types sprays or streams in two different directions, the invention is just as readily useable with conventional fuel injection nozzles wherein the fuel is discharged into the combustion chamber in one direction only and through a simple orifice means.

I claim:

1. In a fuel injection pump for an internal combustion engine, the combination comprising; a pump body; a fuel reservoir associated with said pump body in fluid communication with a fuel source; a fuel pump chamber in said pump body; a fuel discharge port in said pump body in fluid communication with a fuel injector device; spillport means for providing fluid communication between said fuel reservoir and said pumping chamber; a pump plunger reciprocably disposed in said pump body, said plunger being capable of covering said spillport means during its pumping stroke to disrupt fluid communication between said fuel reservoir and said pumping chamber and thereby pump fuel under pressure to the injector device, said plunger being rotatably adjustable about its axis of reciprocation with respect to said valve body to various positions between two limit positions corresponding to no load and full load conditions of the engine, respectively, to vary the quantity of fuel being pumped under pressure to the injector device during each pumping stroke thereof; first relief means in said plunger for relieving the fuel pressure in said pumping chamber to a value below a predetermined value so as to terminate all fuel injection to the injector device; and second relief means in said plunger operable for relieving the fuel pressure in said pumping chamber to a value below a predetermined value only while said plunger is moving a predetermined distance during its pumping stroke to interrupt fuel injection to the injector device, said second relief means being inoperable to interrupt fuel injection to the injector device when said plunger is in certain rotatably adjusted positions with respect to said valve body.

2. In a fuel injection pump as set forth in claim 1, wherein said first and second relief means includes passage means in said plunger continually in fluid communication with said pumping chamber, and said second relief means further includes a groove formed on the periphery of said plunger, said groove being registerable with said spillport means to establish fluid communication between said fuel reservoir and said pumping chamber.

3. In a fuel injection pump as set forth in claim 2 wherein said groove has an arcuate length measured in angular degrees less than the degrees said plunger moves when said plunger is rotated between its two limit positions of adjustment.

4. In a fuel injection pump as set forth in claim 2, wherein said groove is registerable with said spillport means during the pumping stroke of said plunger when said plunger is in one of its two limit positions of rotatable adjustment and is incapable of registering with said spillport means during the pumping stroke of said plunger when said plunger is in the other of its two limit positions of rotatable adjustment.

5. In a fuel injection pump for an internal combustion engine, the combination comprising; a pump body; a fuel reservoir associated with said pump body in fluid communication with a fuel source; a fuel pump chamber in said pump body; a fuel discharge port in said pump body in fluid communication with a fuel injector device; spillport means for providing fluid communication between said fuel reservoir and said pumping chamber; a pump plunger reciprocably disposed in said pump body and reciprocable from a first position to a second position during its pumping stroke, said plunger being capable of covering said spillport means as it reciprocates from said first position to said second position to disrupt fluid communication between said fuel reservoir and said pumping chamber and thereby pump fuel under pressure to the injector device, said plunger being rotatably adjustable about its axis of reciprocation with respect to said valve body to various positions between two limit positions corresponding to no load and full load conditions of the engine respectively, to vary the quantity of fuel being pumped under pressure during each pumping stroke thereof; first relief means in said plunger for relieving the fuel pressure in said pumping chamber to a value below a predetermined value so as to terminate fuel injection to the injector device; and second relief means in said plunger for relieving the fuel pressure in said pumping chamber to a value below predetermined value after said plunger has moved a predetermined distance from its first position during the pumping stroke to a third position to interrupt fuel injection to the injector device, said second relief means being ineffective to interrupt fuel injection to the injector device after said plunger has moved a predetermined distance from said third position to a fourth position, said second relief means including passage means in said plunger in fluid communication with said pumping chamber continuously and in fluid communication with said spillport means when said plunger moves between said third and fourth positions, said passage means being constructed and arranged so that said predetermined distances said plunger moves between said first and third positions and said third and fourth positions, respectively, are simultaneously variable upon rotational adjustment of said plunger.

6. In a fuel injection pump as set forth in claim 5, wherein said passage means includes a groove formed on the periphery of said plunger, said groove being partially defined by first and second undercut surfaces of said plunger, each of said first and second undercut surfaces being substantially contained in respective planes and said planes are angularly oriented with respect to each other.

7. In a fuel injection pump as set forth in claim 6, wherein said planes containing said first and second undercut surfaces intersect the reciprocating axis of said plunger at different angles.

8. In a fuel injection pump as set forth in claim 5, wherein said passage means includes a conically shaped groove on the periphery of said plunger.

References Cited

UNITED STATES PATENTS

| | | |
|---|---|---|
| 2,306,364 | 12/1942 | Skaredoff. |
| 2,810,375 | 10/1947 | Froehlich et al. _____ 123—139 |
| 2,922,581 | 1/1960 | Garday _____ 123—139 X |

LEONARD H. GERIN, *Primary Examiner.*

U.S. Cl. X.R.

103—2, 154